US010539679B2

(12) United States Patent
Yun et al.

(10) Patent No.: US 10,539,679 B2
(45) Date of Patent: Jan. 21, 2020

(54) DETECTING AND LOCALIZATION METHOD OF UNKNOWN SIGNAL USING AIRCRAFT WITH ADS-B SYSTEM

(71) Applicant: Korea Aerospace Research Institute, Daejeon (KR)

(72) Inventors: Youngsun Yun, Daejeon (KR); Jeongho Cho, Daejeon (KR); Moonbeom Heo, Daejeon (KR); Giwook Nam, Daejeon (KR)

(73) Assignee: Korea Aerospace Research Institute (KR)

( * ) Notice: Subject to any disclaimer, the term of this patent is extended or adjusted under 35 U.S.C. 154(b) by 324 days.

(21) Appl. No.: 15/214,223

(22) Filed: Jul. 19, 2016

(65) Prior Publication Data
US 2017/0131411 A1 May 11, 2017

Related U.S. Application Data

(60) Division of application No. 14/517,169, filed on Oct. 17, 2014, now Pat. No. 9,429,655, which is a (Continued)

(30) Foreign Application Priority Data

Nov. 30, 2012 (KR) .................. 10-2012-0137566

(51) Int. Cl.
*G01S 19/21* (2010.01)
*G01S 5/02* (2010.01)
(Continued)

(52) U.S. Cl.
CPC ............ *G01S 19/21* (2013.01); *G01S 5/0036* (2013.01); *G01S 5/0072* (2013.01);
(Continued)

(58) Field of Classification Search
CPC . G01S 5/04; G01S 5/06; G01S 19/215; H04B 1/71
See application file for complete search history.

(56) References Cited

U.S. PATENT DOCUMENTS 5,570,095 A * 10/1996 Drouilhet, Jr. ........ G01S 5/0072
342/357.31
6,169,497 B1 * 1/2001 Robert .................... G08G 1/127
340/988
(Continued)

FOREIGN PATENT DOCUMENTS

| KR | 10-2006-0089161 A | 8/2006 |
| KR | 10-0978535 B1 | 8/2006 |
| KR | 10-1169766 B1 | 7/2012 |

OTHER PUBLICATIONS

Jafarnia-Jahromi et al. "GPS Vulnerability to Spoofing Threats and a Review of Antispoofing Techniques". Hindawi Publishing Corporation International Journal of Navigation and Observation vol. 2012, Article ID 127072, 16 pages (Year: 2012).*
(Continued)

Primary Examiner — Gregory C. Issing
(74) Attorney, Agent, or Firm — Dinsmore & Shohl LLP; Miyoung Shin

(57) ABSTRACT

A method of detecting an unknown signal and estimating a source location of the unknown signal using aircraft based on an automatic dependent surveillance-broadcast (ADS-B) system is provided. The method includes a first step (S100') for obtaining from a plurality of airborne aircrafts provided with a network system, an aircraft signal transmitted to neighboring aircraft. The method further includes a second step (S200') for detecting, by one of the plurality of aircraft, a presence of the unknown signal in the aircraft signal based on one of a time difference of arrival (TDOA) method, a time of arrival (TOA) method, and an angle of arrival (AOA)
(Continued)

method. The method further includes a third step (S300') for estimating the source location of the unknown signal and a fourth step (S400') for transmitting unknown signal generation information and the source to neighboring aircraft and the ATC through a flight information services-broadcast (FIS-B).

1 Claim, 6 Drawing Sheets

Related U.S. Application Data continuation of application No. PCT/KR2013/009659, filed on Oct. 29, 2013.

(51) Int. Cl.

| | | |
|---|---|---|
| *G01S 5/06* | (2006.01) | |
| *G01S 5/00* | (2006.01) | |
| *G01S 5/04* | (2006.01) | |
| *G01S 19/03* | (2010.01) | |

(52) U.S. Cl.
CPC ............. *G01S 5/0215* (2013.01); *G01S 5/04* (2013.01); *G01S 5/06* (2013.01); *G01S 19/03* (2013.01); *G01S 5/02* (2013.01); *G01S 5/0205* (2013.01); *G01S 5/0221* (2013.01)

(56) References Cited

U.S. PATENT DOCUMENTS

| | | | | |
|---|---|---|---|---|
| 6,300,898 | B1 | 10/2001 | Schneider et al. | |
| 6,407,703 | B1* | 6/2002 | Minter | G01S 5/02 342/450 |
| 6,697,008 | B1 | 2/2004 | Sternowski | |
| 6,933,888 | B1* | 8/2005 | Schiffmiller | G01S 5/14 342/387 |
| 7,453,400 | B2* | 11/2008 | Struckman | G01S 5/0221 342/463 |
| 7,508,344 | B2* | 3/2009 | Stroud | G01S 5/06 342/387 |
| 7,551,139 | B1* | 6/2009 | Mesecher | G01S 5/0009 342/387 |
| 7,835,687 | B2* | 11/2010 | Li | G01S 19/21 455/1 |
| 8,138,975 | B2* | 3/2012 | Bull | G01S 5/0215 342/450 |
| 2005/0285781 | A1* | 12/2005 | Park | G01S 19/21 342/357.48 |
| 2007/0247368 | A1* | 10/2007 | Wu | G01S 5/0221 342/465 |
| 2010/0045506 | A1* | 2/2010 | Law | G01S 19/21 342/13 |

OTHER PUBLICATIONS

Brown, Alison et al. "Civil Applications of the GPS Jamming Detection and Location (JLOC) System." NAVSYS Corporation Feb. 23, 2010. pp. 1-19. (Year: 2010).*

Brown et al. "Jammer and Interference Location System—Design and Initial Test Results." Proc. of the ION GPS '99. pp. 1-6. (Year: 1999).*

Fontanella et al. "In-Car GNSS Jammer Localization Using Vehicular Ad-Hoc Networks." Inside GNSS. May/Jun. 2013. pp. 70-80. (Year: 2013).*

Pawlicki, John ."The Growing Debate on the Cyber Safety of NextGen." D.O.M. Magazine Director of Maintenance: The Business of Aircraft Maintenance. Nov. 28, 2012 (Year: 2012) (Year: 2012).*

Purton et al. "Identification of ADS-B System Vulnerabilities and Threats". Australasian Transport Research Forum 2010 Proceedings Sep. 29-Oct. 1, 2010, Canberra, Australia. pp. 1-16. Publication website: http://www.patrec.org/atrf.aspx (Year: 2010) (Year: 2010).*

Richards et al. "New Air Traffic Surveillance Technology". WWW. Boeing.Com/Commercial/AeroMagazine. Qtr—Feb. 2010. pp. 6-13. (Year: 2010) (Year: 2010).*

RTCA DO-260B "Minimum Operational Performance Standards for 1090 MHz Extended Squitter Automatic Dependent Surveillance-Broadcast (ADS-B) and Traffic Information Services-Broadcast (TIS-B)"). Dec. 2009. pp. 1-137. (Year: 2009).*

Scott, L. "J911:Fast Jammer Detection Location Using Cell Phone Crowd Sourcing," GPS World, Nov. 2010, pp. 32-37 and 47.

Lee, J.H. et al., "Location Estimation using Differential RSS with Spatially Correlated Shadowing," IEEE Globelcom 2009 Proceedings, pp. 1-6.

Harris "Deployable Communications System for Airfield Support Applications" pp. 1-20, Jun. 2011, http://rf.harris.com/media/Portable%20Airfield-%20FINAL_tcm26-18162.pdf.

Sierra Nevada Corporation Awarded Contract for U.S. Army Mobile Tower System, Electronic Systems Integration Innovative & Agile Technology Solutions, pp. 1-2, Mar. 15, 2012, http://www.sncorp.com/pdfs/SNC_news/pr_12/snc_mots.pdf/.

* cited by examiner

DETECTING AND LOCALIZATION METHOD OF UNKNOWN SIGNAL USING AIRCRAFT WITH ADS-B SYSTEM

RELATED APPLICATIONS

This is a divisional of U.S. patent application Ser. No. 14/517,169, which is a continuation of Patent Cooperation Treaty (PCT) International Application No. PCT/KR2013/009659, filed on Oct. 29, 2013 and which designates the United States and claims priority to Korean Patent Application No. 10-2012-0137566, filed on Nov. 30, 2012. The entirety of U.S. patent application Ser. No. 14/517,169, Patent Cooperation Treaty (PCT) International Application No. PCT/KR2013/009659 and Korean Patent Application No. 10-2012-0137566 are hereby incorporated by reference herein.

BACKGROUND OF THE INVENTION

The present invention relates to a method of detecting an unknown signal and estimating a source location of the unknown signal using aircraft provided with an automatic dependent surveillance-broadcast (ADS-B) system, and more particularly, to a method of rapidly detecting an unknown signal posing a threat to an air traffic control (ATC) from aircraft provided with an ADS-B system, and estimating a source location of the unknown signal based on the detected unknown signal.

A global navigation satellite system (GNSS) is a system for precisely tracking a location of a ground target on land or an air target using a global navigation satellite network. The GNSS includes a plurality of global navigation satellites, a receiver to receive a signal transmitted from the plurality of global navigation satellites, a ground surveillance station, and a system maintainability surveillance system. A method applied to the GNSS may be implemented by a receiver receiving signals transmitted from navigation satellites and determining a location of the receiver based on measured distances from navigation satellites. For example, use of the GNSS is widespread throughout fields of aerospace, shipping, and automotive navigation systems due to various advantages. Such benefits may be characterized by a signal being obtainable through the receiver irrespective of a geographical location of a user, the receiver being a minimal-size, and mobile positioning being available through an output obtained in real time.

Amid increased global flight demands as of late, an air traffic controller workload has also been on the rise, leading to issues in terms of security, speediness, and efficiency. Due to a limited air traffic management (ATM) system being operated on land only, development of an automatic dependent surveillance-broadcast (ADS-B) system designed to provide complementary air-to-surface and air-to-air functions is garnering attention.

The ADS-B system is a mutually cooperative surveillance system sharing information on locations or speeds of aircraft between controllers and pilots. The international civil aviation organization (ICAO) recommends that an aircraft be equipped with the ADS-B system which is acknowledged to be an appropriate and inexpensive universal system having a novel configuration for a communications, navigation, surveillance/air traffic management (CNS/ATM) system.

In the ADS-B system a single vast wireless network as shown in FIGS. 1 through 5, included are an air traffic control (ATC) serving as a wireless access point and an aircraft serving as a client. Here, the aircraft reports a location of the aircraft through the network, receives traffic situations and other information from a ground system, and issues a timely warning, as necessary, to a controller by providing information integrated by a computer of the ground system. A global navigation satellite illustrated in an upper portion of FIG. 1 connects communication amongst ground systems.

The ADS-B system gathers location information of aircraft by employing the GNSS capable of superior precision positioning than a radar technology generally used, and transmits the location information to the ground system to be used for the ATC. However, in an occurrence of disturbance or interference of a GNSS signal caused by an unknown signal or a purposeful unknown signal, flight security of the aircraft may be jeopardized. In particular, when a high power unknown signal is operated, multiple aircraft may be affected simultaneously and flight security may be placed in peril due to a vast region influenced by the unknown signal and thus, causing an issue to the ATC.

In a presence of such an unknown signal, an occurrence of an unknown signal, and a source location of the unknown signal may be estimated using a signal received from receivers disposed on ground. However, more often than not, the unknown signal is not properly detected because a portion of the receivers on the ground is not affected by the unknown signal, resulting in difficulty in detecting the occurrence of the unknown signal and the source location of the unknown signal. Moreover, when an unknown signal received by a ground receiver is distorted by refraction or reflection, and analyzed to estimate a source location of the unknown signal, precise estimation may not be achieved.

An aspect of the present invention provides a method of detecting an unknown signal and estimating a source location of the unknown signal which is conceived to resolve an issue of detecting an unknown signal and estimating a source location of the unknown signal using the unknown signal received by a ground receiver in a conventional technology. The method according to the present invention aims at efficient reception of an unknown signal, relatively rapid and precise detection of a presence of an unknown signal by analyzing an undistorted unknown signal, and estimation of a source location of the unknown signal.

SUMMARY OF THE INVENTION

According to an aspect of the present invention, there is provided a method of detecting an unknown signal and estimating a source location of the unknown signal using aircraft based on an automatic dependent surveillance-broadcast (ADS-B) system, the method including obtaining, in a first step (S100), from a plurality of airborne aircraft provided with an ADS-B system, aircraft signals transmitted to an air traffic control (ATC) through the ADS-B system comprising global navigation satellite system (GNSS) signals transmitted from GNSS satellites and an unknown signal transmitted from a source location of the unknown signal, detecting, in a second step (S200), by the ATC, a presence of the unknown signal in the aircraft signals using the aircraft signals transmitted from the plurality of aircraft in the first step (S100), estimating, in a third step (S300), the source location of the unknown signal based on one of a time difference of arrival (TDOA) method, a time of arrival (TOA) method, and an angle of arrival (AOA) method when the unknown signal is determined to be included in the aircraft signals in the second step (S200), and transmitting, in a fourth step (S400), unknown signal generation information associated with the unknown signal and the source location of the unknown signal estimated in third step (S300), by ADS-B ground equipment, to neighboring aircraft and the ATC through flight information services-broadcast (FIS-B) or a notice to airmen (NOTAM).

According to an aspect of the present invention, there is provided a method of detecting an unknown signal and estimating a source location of the unknown signal using aircraft based on an ADS-B system, the method including obtaining, in a first step (S100'), from a plurality of airborne aircraft provided with an ADS-B system, an aircraft signal transmitted to neighboring aircraft through the ADS-B system comprising GNSS signals transmitted from navigation satellites and an unknown signal transmitted from a source location of the unknown signal, detecting, in a second step (S200'), by one of the plurality of aircraft, a presence of the unknown signal in the aircraft signal using the aircraft signal transmitted from the neighboring aircraft in the first step (S100'), estimating, in a third step (S300'), the source location of the unknown signal based on one of the TDOA method, the TOA method, and the AOA method when the unknown signal is determined to be included in the aircraft signal in the second step (S200'), and transmitting, in a fourth step (S400'), unknown signal generation information associated with the unknown signal and the source location of the unknown signal estimated in the third step (S300'), by ADS-B equipment provided in the aircraft, to a neighboring aircraft and the ATC through a FIS-B.

According to an aspect of the present invention, there is provided a method of detecting an unknown signal and estimating a source location of the unknown signal using aircraft based on an ADS-B system, the method including obtaining, in a first step (S100), from a plurality of airborne aircraft provided with an ADS-B system, aircraft signals transmitted to an ATC through the ADS-B system comprising GNSS signals transmitted from navigation satellites and an unknown signal transmitted from a source location of the unknown signal, and obtaining jammer to noise (J/N) power ratio measurements, detecting, in a second step (S200), by the ATC, a presence of the unknown signal in the aircraft signals by analyzing the J/N measurements, using the aircraft signals transmitted from the plurality of aircraft in the the first step (S100), estimating, in a third step (S300), the source location of the unknown signal using the J/N measurements when the unknown signal is determined to be included in the aircraft signals in the second step (S200), and transmitting, in a fourth step (S400), unknown signal generation information associated with the unknown signal and the source location of the unknown signal estimated in the third step (S300), by ADS-B ground equipment, to neighboring aircraft and the ATC through a FIS-B or an NOTAM.

According to embodiments of the present invention, it is possible to rapidly and precisely detect an unknown signal and a source location of the unknown signal by using information collected from airborne aircraft provided with an automatic dependent surveillance-broadcast (ADS-B) to detect the unknown signal and the source location, thus removing effects of refraction or reflection of a signal.

According to embodiments of the present invention, it is possible to rapidly and precisely determine, in an occurrence of a problem in a global navigation satellite system (GNSS) location solution, whether the problem is caused by an unknown signal or other reasons using information collected from a plurality of airborne aircraft.

According to embodiments of the present invention, it is possible to readily estimate a source location of an unknown signal and an altitude of the unknown signal by estimating the source location from various positions using information obtained from a plurality of airborne aircraft.

According to embodiments of the present invention, it is possible to detect an unknown signal and estimate a source location of the unknown signal simply and at a low cost by using a jammer to noise (J/N) power.

DETAILED DESCRIPTION OF THE PREFERRED EMBODIMENTS

Figure 1:
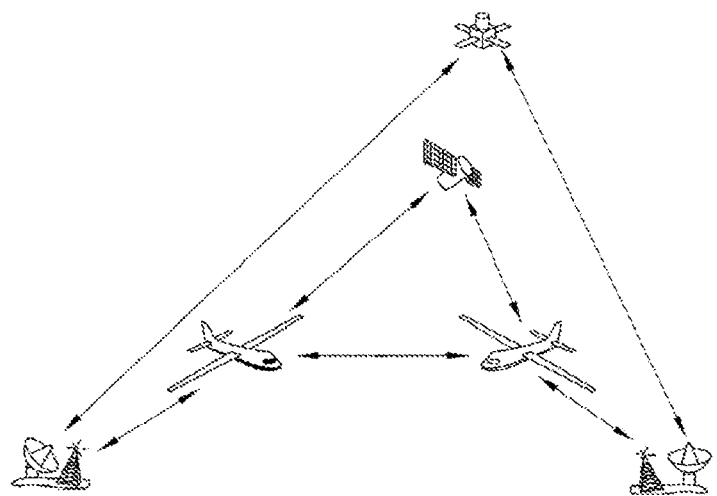
FIG. 1 is a diagram illustrating an overview configuration of an automatic dependent surveillance-broadcast (ADS-B) system according to an embodiment of the present invention.
Figure 2:
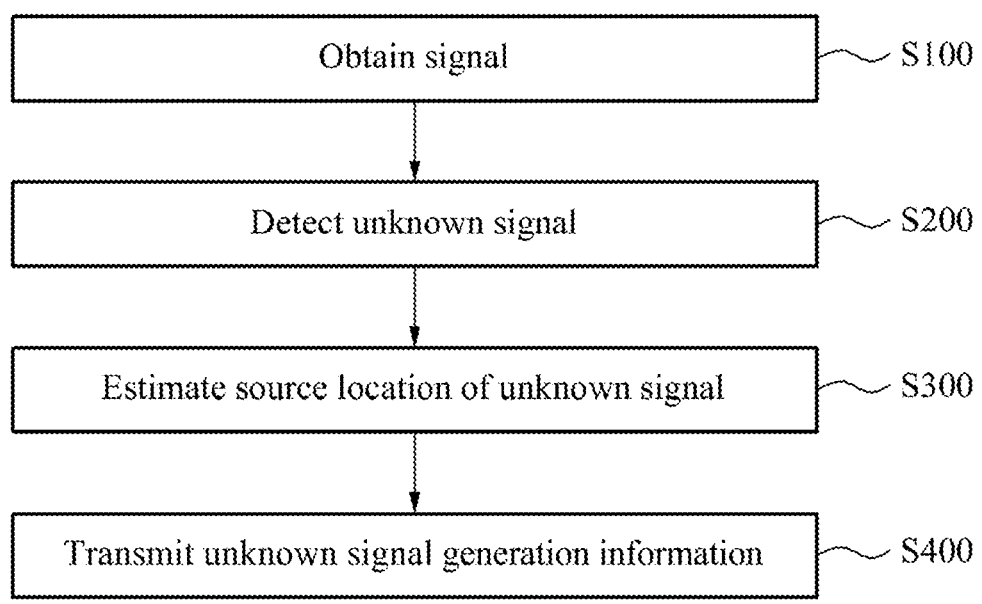
FIGS. 2 and 3 are flowcharts illustrating a method of detecting an unknown signal and detecting a source location of the unknown signal using aircraft based on an ADS-B system according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

An aspect of the present invention provides a method of detecting an unknown signal and estimating a source location of the unknown signal that rapidly and precisely detects an unknown signal and estimates a source location of the unknown signal using airborne aircraft provided with an automatic dependent surveillance-broadcast (ADS-B) system. The method enables detection of an occurrence of the unknown signal and detection of the source location of the unknown signal from any one of an air traffic control (ATC) and the aircraft. Accordingly, hereinafter, the method will be discussed in two embodiments based on an estimation agent.

Embodiment 1: Estimation Performed by Ground ATC

A method of detecting an unknown signal and estimating a source location of the unknown signal performed by an ATC includes obtaining, in a first step (S100), a signal, detecting, in a second step, (S200) an unknown signal, estimating, in a third step (S300), a source location of the unknown signal, and transmitting, in a fourth step (S400) unknown signal generation information.

The first step (S100), obtaining of the signal includes receiving, by a plurality of airborne aircraft provided with an ADS-B system, aircraft signals comprising global navigation satellite system (GNSS) signals transmitted from navigation satellites and an unknown signal transmitted from a source location of the unknown signal, and transmitting the aircraft signals comprising the GNSS signal and the unknown signal to an ATC through the ADS-B system.

When a jammer to noise (J/N) power ratio measurement is used to detect the unknown signal, the plurality of airborne aircraft transmits the J/N measurements to the ATC on land in lieu of the GNSS signal and the unknown signal through the ADS-B system. Descriptions pertaining to the J/N measurements will be provided later.

In a manner dissimilar to a method of detecting an unknown signal using a signal received from conventional ground receivers through an ATC, the method according to the present embodiment receives, by airborne aircraft, signals transmitted from navigation satellites and an unknown source. Here, the signals are transmitted to the ground ATC through the ADS-B system in the form of aircraft signals. As previously described, since a receiver installed on land such as the ATC may not receive an unknown signal, and receive a signal distorted by refraction or reflection, the method according to the present disclosure is provided to enhance precision of detecting the unknown signal using the signal received from the aircraft rather than the signal received from the ATC.

According to an aspect of the present invention, the unknown signal may be continuously detected by the aircraft provided with the ADS-B system that receives the GNSS signals transmitted from the navigation satellites and the unknown signal transmitted from the unknown source location, and, through aircraft signals, transmits the signals to the ground ATC through the ADS-B system. To this end, according to an aspect of the present invention, a message, for example, a source code, to detect a presence of the unknown signal is included in addition to information on a location, a speed, and an altitude of an aircraft basically collected from the ADS-B system, thus establishing a system for detecting an unknown signal without changing or additionally installing a communication instrument.

The second step (S200), detecting of the unknown signal includes analyzing aircraft signals transmitted from a plurality of aircraft, and detecting a presence of an unknown signal from the aircraft signals.

In the analysis of the signals transmitted from the plurality of aircraft, when the unknown signal is included in the aircraft signals, each of the plurality of aircraft divides the aircraft signals transmitted from the plurality of aircraft into identical time blocks, converts the signals to a plurality of frequency areas, and obtains power statistics from the plurality of frequency areas. When a spectrum mask of a legitimate signal is applied to the power statistics, and a frequency having power significantly deviating from a frequency mask is verified to be present, interference by an unknown signal is determined to be detected, and therefore a presence of the unknown signal is detected.

The third step (S300), estimating of the source location of the unknown signal includes estimating a source location of an unknown signal when the unknown signal is determined to be included in signals transmitted from a plurality of aircraft through the foregoing process.

When the unknown signal is wirelessly propagated from the source location, the unknown signal is emitted to all directions as a spherical wave. In this example, a time delay occurs because the unknown signal, for example, a wireless signal, moves at a predetermined speed, and power decreases due to spherical spreading. In detail, when the unknown signal is emitted from the unknown source, a time delay occurs in proportion to a distance between a transmission point and a reception point, and power is reduced by an amount proportional to the distance between the transmission point and the reception point. As a result, the source location of the unknown signal is estimated based on such characteristics of the time delay and the power reduction.

Accordingly, the method disclosed herein may be classified into a method based on time delay and a method based on power change during propagation of an unknown signal. Examples of the method based on the time delay may include a time of arrival (TOA) method based on an arrival time of a propagated signal, a time difference of arrival (TDOA) method based on a difference of arrival times of propagated signals, and an angle of arrival (AOA) method based on an arrival angle of a signal.

Also, examples of the method based on the power change may include a received signal strength (RSS) method based on strength of a received signal, a power of arrival (POA) method, a power difference of arrival (PDOA) method, and a frequency difference of arrival (FDOA) method based on a frequency change due to Doppler effects caused by a movement of a receiver.

However, the TOA method generally used in a GNSS requires time synchronization between a transmission point in time and a reception point in time. The AOA method, albeit insusceptible to the time synchronization, requires antenna alignment amongst reception sensors and has inferior location estimation precision to the TDOA method. The TDOA method exhibits greater efficiency as a method of estimating a location of an unknown signal than the other methods because the TDOA method may be applied to an instance in which an input signal is unknown.

Hereinafter, the method of estimating the source location of the unknown signal based on the TDOA method will be described.

Figure 4A:
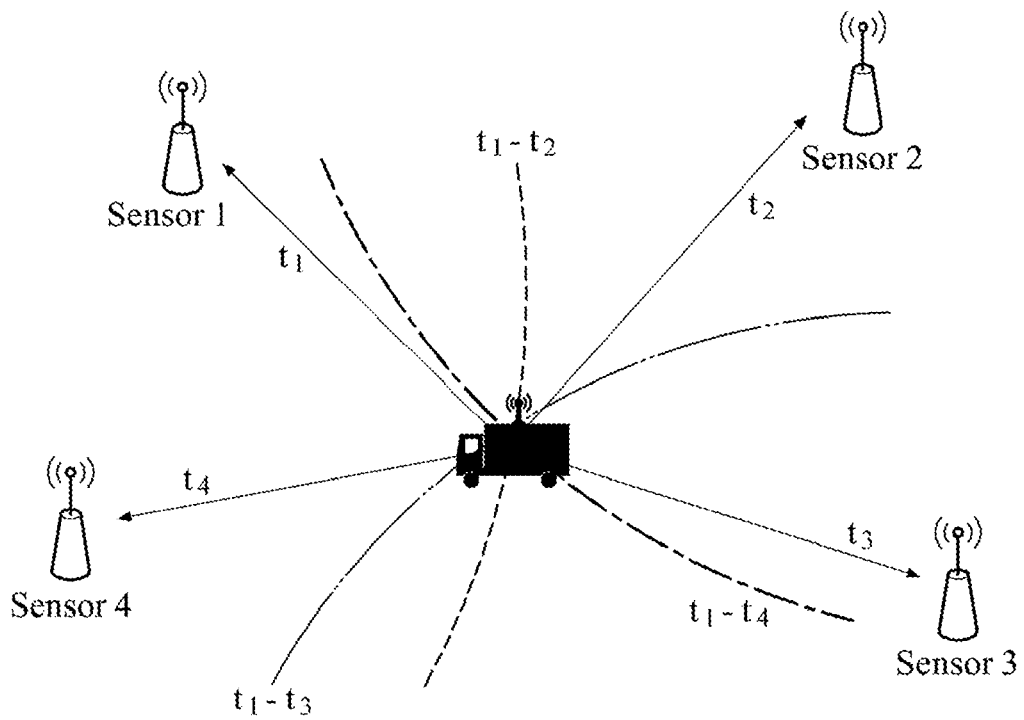
FIG. 4A is a diagram illustrating an overview of a method of estimating a source location of an unknown signal according to an embodiment of the present invention.
Figure 4B:
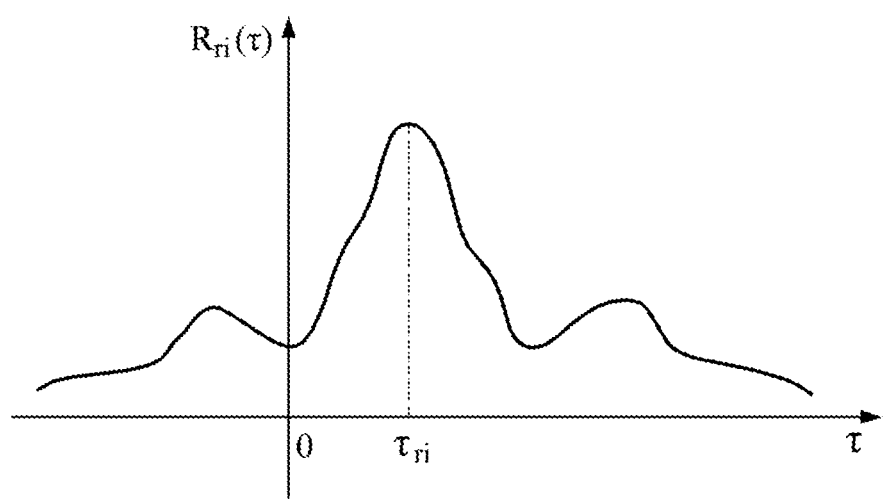
FIG. 4B is a graph illustrating a time difference of arrival (TDOA) measurement when a cross-correlation function is applied according to an embodiment of the present invention.
Figure 5:
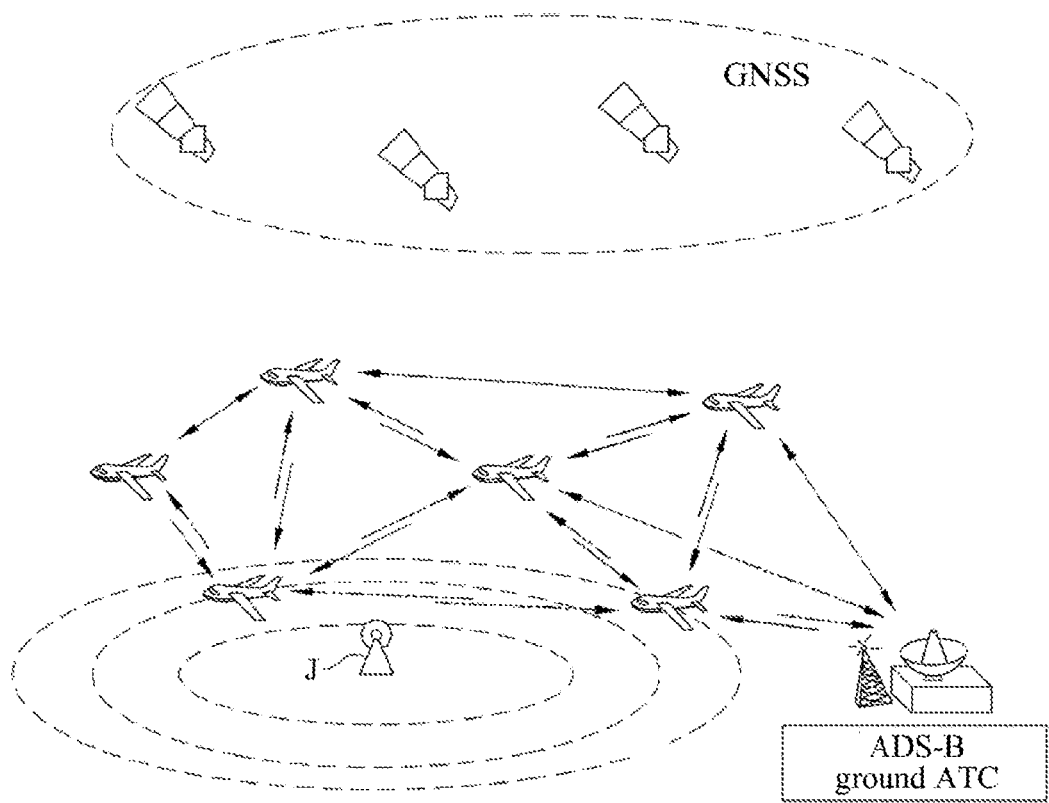
FIG. 5 is a structure diagram illustrating a method of detecting an unknown signal and detecting a source location of the unknown signal using aircraft based on an ADS-B system according to an embodiment of the present invention.

A TDOA-based location estimation method employs a difference of delayed arrival times of signals includes disposing a reference sensor and a predetermined sensor differing from the reference sensor, and obtaining a location of a signal source using a difference of delayed arrival times of signals received from each of the sensors. In this example, the location of the signal source obtained by the difference of delayed arrival times is represented by a plurality of hyperbolic curves as shown in FIG. 4A. The location of the signal source is estimated by obtaining a point at which the plurality of hyperbolic curves converges.

The difference of delayed arrival times between the two sensors is obtained using a cross-correlation function expressed by Equation 1. When the signals received from the two sensors $s_r$ and $s_i$, respectively, are cross-correlated, a cross-correlation value $R_{ri}(\tau)$ indicated by a curve of FIG. 4A has a single maximum value. In this example, a delay time until reaching the maximum value is a TDOA measurement, for example, a difference of delayed arrival times denoted by $\tau_{ri}$.

$$R_{ri}(\tau) = E[s_r(t)s_i(t-\tau)] = \frac{1}{T}\int_0^T s_r(t)s_i(t-\tau)\,d\tau \quad \text{[Equation 1]}$$

In Equation 1, $R_{ri}(\tau)$ denotes a cross-correlation value of signals received from the reference sensor $s_r$ and an i-th sensor $s_i$. $s_r(t)$ and $s_i(t)$ denotes a signal received from the reference sensor $s_r$ and a signal received from the i-th sensor $s_i$ at a "t" point in time. T denotes an integral time, and $\tau$ denotes a delay time.

A difference of the delayed arrival times between the reference sensor $s_r$ provided on an aircraft and the i-th sensor $s_i$ is a TDOA measurement $\tau_{ri}$, which corresponds to a difference of locations with respect to a speed C of signals. Accordingly, the TDOA measurement $\tau_{ri}$ is calculated using a function with respect to the source location of the unknown signal and the locations of the two sensors expressed by Equation 4.

$$\tau_{ri} = (t_r - t_s) - (t_i - t_s) \qquad \text{[Equation 4]}$$
$$= \frac{\sqrt{(x-x_r)^2 + (y-y_r)^2} - \sqrt{(x-x_i)^2 + (y-y_i)^2}}{c}$$
$$= f_{r,i}(x, y, x_r, y_r, x_i, y_i)$$

In Equation 4, $t_s$ denotes a point in time at which a signal is transmitted from an unknown source, $t_r$ denotes a point in time at which the reference sensor $s_r$ receives the unknown signal, $t_i$ denotes a point in time at which the i-th sensor $s_i$ receives the unknown signal, (x,y) denotes location coordinates of the unknown signal source, $(x_r, y_r)$ denotes location coordinates of the reference sensor $s_r$, and denotes a speed of a signal.

When the TDOA measurement $\tau_{ri}$ is obtained, the source location (x,y) of the unknown signal is calculated by Equation 4. (x,y) is not calculated directly because Equation 4 is a non-linear equation. Accordingly, Equation 4 is linearized to be represented by Equation 5 by applying Taylor series to Equation 4.

$$\tau_{ri} = f_{r,i}(\bullet) \cong f_{r,i}(\bullet)\Big|_{(x_0,y_0)} + \frac{\partial f_{r,i}(\bullet)|_{(x_0,y_0)}}{\partial x_0}\delta x + \qquad \text{[Equation 5]}$$
$$\frac{\partial f_{r,i}(\bullet)|_{(x_0,y_0)}}{\partial y_0}\delta y$$
$$= \frac{1}{c}\sqrt{(x_0-x_r)^2 + (y_0-y_r)^2} -$$
$$\sqrt{(x_0-x_1)^2 + (y_0-y_1)^2} +$$
$$\frac{1}{c}\frac{x_0-x_i}{\sqrt{(x_0-x_i)^2+(y_0-y_i)^2}} -$$
$$\frac{x_0-x_1}{\sqrt{(x_0-x_1)^2+(y_0-y_1)^2}} +$$
$$\frac{1}{c}\frac{y_0-y_i}{\sqrt{(x_0-x_i)^2+(y_0-y_i)^2}} -$$
$$\frac{y_0-y_1}{\sqrt{(x_0-x_1)^2+(y_0-y_1)^2}}$$

In Equation 5, $(x_0, y_0)$ denotes initial location coordinates of the unknown signal source.

When N number of sensors exist, Equation 6 in a matrix type is given by setting a first sensor to be a reference sensor r, and applying each of remaining sensors, for example, a second sensor through an N-th sensor, to an i-th sensor one at a time in a sequence.

$$\frac{1}{c}\begin{bmatrix} G_{x21} & G_{y21} \\ G_{x31} & G_{y31} \\ \vdots & \vdots \\ G_{xN1} & G_{yN1} \end{bmatrix}\begin{bmatrix} \delta x \\ \delta y \end{bmatrix} = \begin{bmatrix} \tau_{12} - \tau_{12}|_{(x_0,y_0)} \\ \tau_{13} - \tau_{13}|_{(x_0,y_0)} \\ \vdots \\ T_{1N} - T_{1N}|_{(x_0,y_0)} \end{bmatrix} \qquad \text{[Equation 6]}$$
$$G\delta = Z$$

In Equation 6, $G_{xi1}$ is calculated by $$\frac{x_0 - xi}{\sqrt{(x_0 - x_i)^2 + (y_0 - y_i)^2}} - \frac{x_0 - x_1}{\sqrt{(x_0 - x_1)^2 + (y_0 - y_1)^2}},$$

$G_{yi1}$ is calculated by $$\frac{y_0 - y_i}{\sqrt{(x_0 - x_i)^2 + (y_0 - y_i)^2}} - \frac{y_0 - y_1}{\sqrt{(x_0 - x_1)^2 + (y_0 - y_1)^2}}$$

$\tau_{ri}|(x_0, y_0)$ is calculated by $(\sqrt{(x_0-x_r)^2+(y_0-y_r)^2} - \sqrt{(x_0-x_i)^2+(y_0-y_i)^2})/c$, $\delta$ denotes a location variation, and Z denotes a residual, for example, a difference between a measurement and an estimation.

An estimation of a location variation is used because the location variation $\delta$ is difficult to be calculated directly by Equation 6, which is represented by Equation 7 suggested by W. H. Foy in "Position-location Solution by Taylor-series Estimation" (The Institute of Electrical and Electronics Engineers (IEEE) Transactions on Aerospace and Electronic System, vol. AES-12, no. 2, pp. 187-194, March 1976), which is hereby incorporated by reference herein.

$$\delta = [G^T Q^{-1} G]^{-1} G^T Q^{-1} Z \qquad \text{[Equation 7]}$$

In Equation 7, Q denotes a covariance matrix of a measured error.

Accordingly, as represented by Equation 8, estimated location coordinates $(\hat{x}, \hat{y})$ of the unknown signal source is calculated by a sum of an initial location $(x_0, y_0)$ and the location variation $\hat{\delta}$ estimated by Equation 7.

$$\begin{bmatrix} \hat{x} \\ \hat{y} \end{bmatrix} = \begin{bmatrix} x_0 \\ y_0 \end{bmatrix} + \begin{bmatrix} \delta\hat{x} \\ \delta\hat{y} \end{bmatrix} \qquad \text{[Equation 8]}$$

As represented by Equation 8, the estimated location coordinates are largely based on the initial location $(x_0, y_0)$. As a result, a final estimated location coordinates $(\hat{x}, \hat{y})$ of the unknown signal source are not directly obtained through a single calculation, however, rather obtained by re-applying the estimated location coordinates to $(\hat{x}, \hat{y})$ to the initial location $(x_0, y_0)$ and iterating the foregoing process of Equations 5 through 8. The iterating of the process is performed until a stop condition is satisfied. An example of the stop condition may include an instance in which the location variation $\hat{\delta}$ is less than a predetermined threshold value (TH).

Thus far, the method of estimating the unknown signal source location based on the TDOA method is provided. However, the estimation is also possible by the other methods, for example, the RSS method or a differential RSS (DRSS) method based on a J/N measurement.

The RSS method using the J/N measurement is a method of estimating a source location of an unknown signal based on a difference of strength of received signals using a J/N measurement. As used herein, the J/N measurement refers to a strength of an unknown signal with respect to noise.

When an unknown signal is included in a signal received by a GNSS receiver, strength of a J/N measurement varies, which enables an easy detection of the unknown signal and estimation of a source location of the unknown signal. The J/N measurement is obtained by a J/N meter provided along with an analog-to-digital (A/D) converter that configures the GNSS receiver.

A plurality of J/N measurements obtained through the foregoing process is transmitted and collected by a neighboring aircraft or a ground ATC. When the collected J/N measurement is greater than a reference value set using a range of J/N measurements in normal circumstances, the unknown signal is determined to be present, and an occurrence of an error in a predetermined receiver is also determined based on the plurality of collected J/N measurements.

Hereinafter, descriptions pertaining to estimation of the source location of the unknown signal based on a variation in the J/N measurement in response to a distance change will be provided.

A difference $dJ_{ij}$ of strength of unknown signals received by receivers (i, j), respectively, is represented by Equation 9 based on a path loss model.

$$dJ_{ij} = J_i - J_j = 10\alpha\log_{10}\left(\frac{d_j}{d_i}\right) \quad \text{[Equation 9]}$$

In Equation 9, and $J_i$ and $J_j$ each denote strengths of unknown signals received by receivers (i,j), α denotes a path loss index, $d_i$ and $d_j$ each denote a distance from a source location of an unknown signal to the receivers (i,j).

As represented by Equation 9, the path loss index α varies based on a propagation environment, and in an absence of an obstacle between the source location of the unknown signal and the receivers, the path loss index α is "2". An approximate value close to "2" is applied to the path loss index α according to the method of the present invention because such obstacles are rarely present between a source location of an unknown signal and a GNSS receiver provided in an aircraft.

The difference $dJ_{ij}$ of strength of unknown signals is calculated by Equation 9 as described above, however, also calculated by Equation 10 using a difference of J/N measurements obtained by the receivers (i,j). In Equation 10, $JNR_i$ and $JNR_j$ each denote J/N measurement in the receivers (i,j). $N_i$ denotes noise of the receiver (i), and since the noise may differ in a plurality of receivers based on design methodologies, a standardization or revision process may be required as necessary.

$$dJ_{ij}=JNR_i-JNR_j=(J_i-N_i)-(J_j-N_j)\approx J_i-J_j \quad \text{[Equation 10]}$$

When the difference $dJ_{ij}$ of strength of the unknown signals is calculated by Equation 10, the source location $$X = \begin{bmatrix} x \\ y \end{bmatrix}$$

of the unknown signal is calculated by Equation 11.

$$AX=B \quad \text{[Equation 11]}$$

In Equation 11, $$A = \begin{bmatrix} x_{c13} - x_{c12} & y_{c13} - y_{c12} \\ x_{c23} - x_{c12} & y_{c23} - y_{c12} \\ x_{c23} - x_{c13} & y_{c23} - y_{c13} \end{bmatrix},$$

$$B = \frac{1}{2}\begin{bmatrix} R_{12}^2 - R_{13}^2 - (x_{c12}^2 + y_{c12}^2) + (x_{c13}^2 + y_{c13}^2) \\ R_{12}^2 - R_{23}^2 - (x_{c12}^2 + y_{c12}^2) + (x_{c23}^2 + y_{c23}^2) \\ R_{13}^2 - R_{23}^2 - (x_{c13}^2 + y_{c13}^2) + (x_{c23}^2 + y_{c23}^2) \end{bmatrix},$$

$$x_{cij} = (r_{ij}^2 x_j - x_i)/(r_{ij}^2 - 1),\ y_{cij} = (r_{ij}^2 y_j - y_i)/(r_{ij}^2 - 1),$$

$$R_{ij}^2 = [1/(r_{ij}^2-1)^2 + 1/(r_{ij}^2-1)][(x_i-x_j)^2 + (y_i-y_j)^2],$$

$$r_{ij} = \frac{d_i}{d_j} = 10^{\frac{dJ_{ji}}{10\alpha}},$$

and $(x_i,y_i)$ and denotes a location of the receiver (i).

Accordingly, estimation of the source location of the unknown signal using the J/N measurements is relatively simple, inexpensive, and convenient when compared to the TDOA method because transmission of massive data is unnecessary.

The fourth step (S400), transmitting S400 of the unknown signal generation information includes, in the case of detecting, by a ground ATC, an occurrence of an unknown signal and thereby estimating a source location of the unknown signal, inputting, by a ground ADS-B system, the information to a computer in a control console of a neighboring aircraft through flight information services-broadcast (FIS-B) or a notice to airmen (NOTAM), informing the aircraft flying in a neighborhood neighborhood of the occurrence of the unknown signal, and at the same time, converting to a backup system, for example, a conventional radar facility or a conventional navigation system. In this example, flight safety may be significantly increased by a ground system transmitting a location solution to the neighboring aircraft neighborhood using backup navigation equipment, and continuing the flight in a state in which the unknown signal is removed.

Embodiment 2: Estimation Performed by Aircraft

Figure 3:
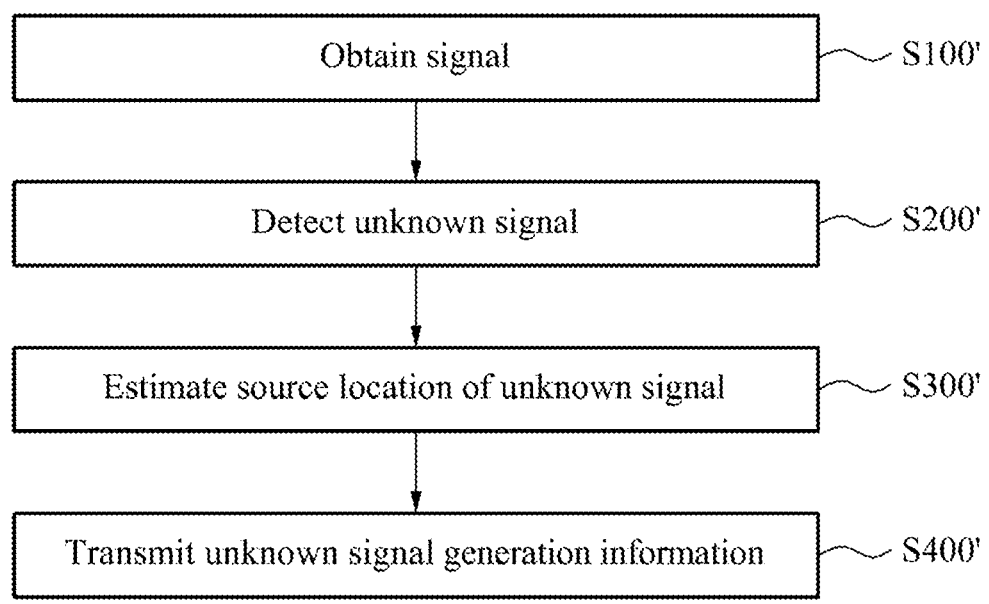

A method of detecting an unknown signal and estimating a source location of the unknown signal performed by aircraft includes obtaining, in a first step (S100'), signals, detecting, in a second step (S200'), an unknown signal, estimating, in a third step (S300'), a source location of the unknown signal, and transmitting, in a fourth step (S400'), unknown signal generation information as shown in FIG. 3. Hereinafter, brief descriptions of each operation will be provided since an overall process of Embodiment 2 is the same as Embodiment 1, barring a difference in that the estimation of Embodiment 2 is performed by the aircraft rather than the ATC.

The first step (S100'), obtaining of the signal includes receiving, from aircraft provided with an ADS-B system, an aircraft signal comprising GNSS signals transmitted from navigation satellites and an unknown signal transmitted from a source location of the unknown signal, and transmitting the aircraft signal comprising the GNSS signal and the unknown signal to neighboring aircraft through the ADS-B system.

The second step (S200'), detecting of the unknown signal includes analyzing aircraft signals transmitted from neighboring aircraft, and detecting a presence of an unknown signal in the aircraft signals.

The third step (S300'), estimating of the source location of the unknown signal includes estimating a source location of an unknown signal using the TDOA measurement $T_{ri}$ obtained in the second step (S200') of the unknown signal.

In a manner dissimilar to Embodiment 1, the source location of the unknown signal is estimated by an airborne aircraft, rather than a ground ATC. However, description previously provided in Embodiment 1 may be applied to a remaining process aside from the estimation.

The fourth step (S400'), transmitting of the unknown signal generation information includes, in the case of detecting, by an aircraft, an occurrence of an unknown signal and thereby estimating a source location of the unknown signal, inputting, by ADS-B equipment provided in the aircraft, the information to a computer in a control console of aircraft flying in a neighborhood through FIS-B or an NOTAM, informing the neighboring airborne aircraft and an ATC of the occurrence of the unknown signal, and at the same time, converting to a backup system.

Although the forgoing descriptions provide that a source location of an unknown signal is detected using aircraft signals obtained from a plurality of airborne aircraft, according to the method of the present invention, a single or a couple of aircraft flying circuitous routes in a predetermined region may be used to collect J/N measurements using signals transmitted from an unknown signal source and—navigation satellites, and detect the source location of the unknown signal using the collected J/N measurements.

According to embodiments of the present invention, it is possible to rapidly and precisely detect an unknown signal and estimate a source location of the unknown signal by collecting information associated with the unknown signal from aircraft provided with an ADS-B system, detecting the source location of the unknown signal using the information, and thus removing effects of refraction or reflection of a signal.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

We claim:

1. A method of detecting an unknown signal and estimating a source location of the unknown signal using network connected aircraft, the method comprising:

obtaining, in a first step (S100'), from a plurality of airborne aircrafts operating in a wireless communication network implementing an automatic dependent surveillance-broadcast (ADS-B) system, an aircraft signal comprising GNSS signals transmitted from navigation satellites and an occurrence of disturbance or interference of the GNSS signals, the aircraft signal transmitted to one of the plurality of aircrafts through the ADS-B system;

wherein in the ADS-B system, the ATC serves as a wireless access point and the plurality of airborne aircrafts serve as a client;

detecting, in a second step (S200'), by one of the plurality of aircraft, a presence of the unknown signal in the aircraft signal based on the aircraft signal transmitted from the plurality of aircrafts in the first step (S100');

wherein the airborne aircrafts are located within a physical distance capable of receiving the occurrence of disturbance or interference at a predetermined relevant time period, the disturbance or interference encompassed within a frequency spectrum of the GNSS signals;

wherein detecting in the second step (S200') further comprises:

dividing the aircraft signals into identical time blocks;

converting divided aircraft signals to a plurality of frequency areas;

obtaining power statistics from the plurality of frequency areas;

applying a spectrum mask of the GNSS to the power statistics;

determining a presence of a power of a frequency deviated from a power of a frequency spectrum mask of the GNSS signals; and determining the occurrence of disturbance or interference of the GNSS signals based on the presence of the deviated power of the frequency;

estimating, in a third step (S300'), the source location of the unknown signal based on one of a TDOA method, a TOA method, and an AOA method and an altitude of the unknown signal when the occurrence of disturbance or interference associated with the unknown signal on the GNSS signals is detected from the aircraft signal in the second step (S200'); and transmitting, in a fourth step (S400'), a message including a source code indicative of the presence of the occurrence of disturbance or the interference associated with the unknown signal, detected in the second step (S200') and the source location of the unknown signal estimated in the third step (S300'), to one or more neighboring aircrafts and the ATC through a flight information services-broadcast (FIS-B);

wherein in the detection step (S200'), detection of the presence of the unknown signal is not based on a signal received at a receiver installed at the ATC, thereby enhancing the precision of the detection of the presence of the unknown signal.

* * * * *